United States Patent [19]

Harris

[11] Patent Number: 4,475,389
[45] Date of Patent: Oct. 9, 1984

[54] RADIATOR CAP PROBE

[75] Inventor: Robert S. Harris, Connersville, Ind.

[73] Assignee: Stant Inc., Connersville, Ind.

[21] Appl. No.: 410,505

[22] Filed: Aug. 23, 1982

[51] Int. Cl.³ .......................................... G01F 23/10
[52] U.S. Cl. .............................. 73/304 R; 340/620; 340/59
[58] Field of Search ............. 340/620, 59; 73/304 R, 73/290 R; 123/41.15

[56] References Cited

U.S. PATENT DOCUMENTS 3,938,117 2/1976 Bozoian ........................... 340/59 X
4,110,740 8/1978 Akita ............................ 73/304 R X
4,277,773 7/1981 Blatnik ......................... 73/304 R X Primary Examiner—Charles A. Ruehl
Assistant Examiner—James R. Giebel
Attorney, Agent, or Firm—Barnes & Thornburg

[57] ABSTRACT

A radiator cap having an outer shell and a pressure vacuum valve assembly for closing the filler neck of a radiator includes a probe for detecting the coolant level in the radiator. The probe projects from the cap into the radiator interior and is electrically isolated from the radiator. An electrical connection is provided through the shell to connect the probe to a power source and indicator.

4 Claims, 3 Drawing Figures

RADIATOR CAP PROBE

The present invention relates to caps for radiator filler necks, and more particularly to a radiator cap which also functions as a probe for detecting coolant level within the radiator.

Radiator caps having an outer shell and a pressure/vacuum valve assembly attached to the outer shell for closing the filler neck of a radiator are well known. Further, probes for detecting levels of liquid are also well known.

In the operation of a vehicle, it is often necessary to check the level of coolant within the radiator. Frequently, operators and attendants of vehicles remove the radiator cap to check the coolant level after the vehicle has been running and the coolant is very hot. When the radiator cap is removed, hot steam and vapor is expelled through the filler neck, thus creating a hazardous condition to the person removing the cap. It would be advantageous to be able to determine the coolant level within the radiator without necessitating the removal of the cap.

According to the present invention, a cap for a radiator filler neck has an outer shell, a closure member which in the preferred embodiment includes a pressure/vacuum valve assembly, means for attaching the valve assembly to the outer shell, a probe projecting from the cap into the radiator interior, and an electrical connection to the probe through the outer shell. The cap also includes means for electrically isolating the probe from the radiator.

In one illustrative embodiment, the cap includes a rivet for attaching the valve assembly to the outer shell, and electrically non-conductive means for isolating the rivet and valve assembly from the outer shell. In this embodiment, an electrical conductive path is provided through the valve assembly and the rivet. A terminal coupled to the rivet provides an electrical connection to the probe.

In another illustrative embodiment, the probe is coupled to a portion of the valve assembly which is electrically isolated from the remainder of the valve assembly. The rivet attaching the valve assembly to the outer shell includes an insulative sleeve and a terminal post extending axially therethrough. A lead wire connects the post to the electrically isolated portion of the valve assembly.

In a further embodiment, the rivet attaching the valve assembly to the outer shell is electrically insulative, a portion of the valve assembly is electrically isolated from the remainder of the valve assembly, a probe projects from the electrially isolated portion of the valve assembly into the radiator interior, and a lead wire connects the portion of the valve assembly to a terminal on the insulative rivet.

A system for sensing the coolant level in a radiator includes a cap for a radiator filler neck embodying the present invention. The cap includes an outer shell, a valve assembly, means for connecting the valve assembly to the outer shell, a probe projecting into the radiator interior, means for electrically isolating the probe from the radiator, and means for providing an electrical connection to the probe through the outer shell. The system further includes an electrical power source, an indicator having a first state and a second state, and means for coupling the power source and indicator in a circuit between the probe and a portion of the radiator such that when the coolant level in the radiator is sufficient to contact the probe, the indicator is in the first state and when the coolant level in the radiator is not sufficient to contact the probe, the indicator is in the second state.

In a further embodiment of the present invention, a time-delay means is connected in the circuit between the probe and the radiator to delay a change in state of the indicator. This feature is provided to eliminate false indications of a low coolant level resulting from movement of the coolant in the radiator during operation of the vehicle.

Other features and advantages of the present invention will become apparent in view of the following detailed description of embodiments thereof exemplifying the best mode of carrying out the invention as presently perceived, which description should be considered in conjunction with the accompanying drawings, in which.

Figure 1:
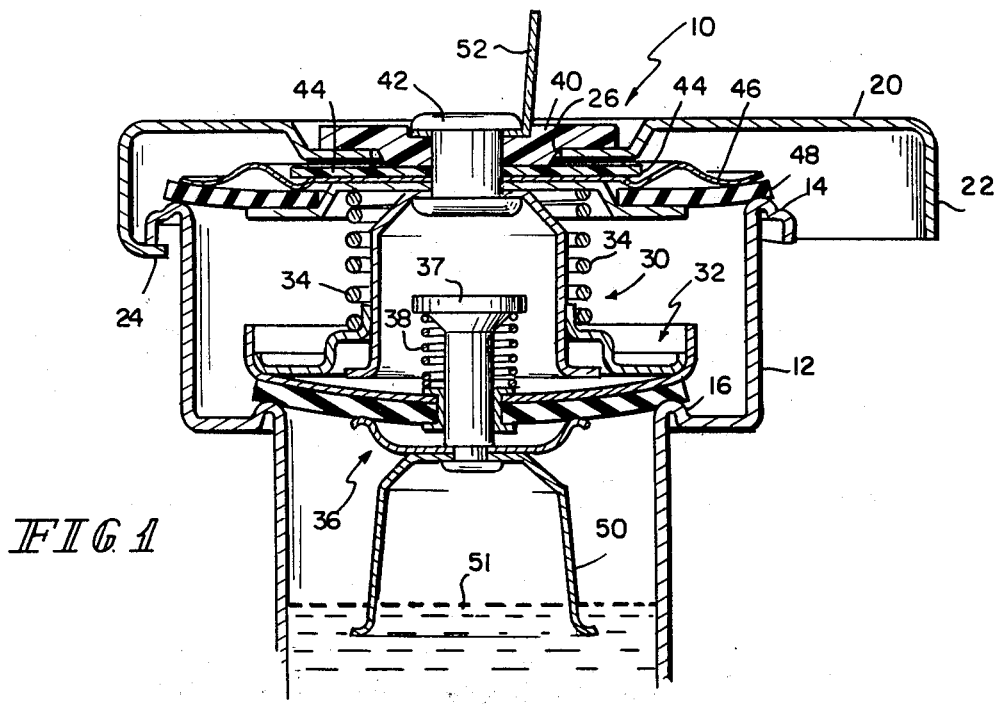
FIG. 1 is a cross-sectional view of one embodiment of a radiator closure cap constructed according to the present invention.

Referring to FIG. 1, a radiator cap 10 embodying the present invention is received in a radiator filler neck 12. A typical radiator filler neck 12 includes a radially outwardly extending lip 14 and a radially inwardly extending seat portion 16.

In the illustrative embodiment of the present invention, the radiator closure cap 10 includes an outer shell 20 having a downwardly depending skirt 22 and a radially inwardly extending flange 24 for engaging the lip 14 of the radiator filler neck 12. The outer shell 20 is preferably constructed of metal and includes a central opening 26. The cap 10 further includes closure means 30 providing a pressure/vacuum valve assembly. The closure means 30 includes a pressure valve member 32 which is biased axially inwardly against the seat 16 by a spring 34 to close the filler neck 12. Closure means 30 also includes a vacuum valve member 36 which is retained by a rivet 37 and biased against the pressure valve member 32 by a spring 38. In the embodiment shown in FIG. 1, valve members 32 and 36 are constructed of metal and contact each other to provide an electrically conductive path therebetween. It will be appreciated that the outer shell 20 may be constructed of material other than metal, such as, for example, plastic, without departing from the scope of the present invention.

Continuing to refer to FIG. 1, a retainer 40 is inserted in the central opening 26 and engages the axially outer surface of the shell 20. In the embodiment shown in FIG. 1, the retainer is constructed of an electrically non-conductive plastic material. A rivet 42 projects downwardly through retainer 40 and engages the pressure/vacuum valve assembly 30 to provide a connection between the valve assembly 30 and the outer shell 20. A washer 44 is interposed between the valve assembly 30 and the outer shell 20. The washer 44 is also constructed of electrially non-conductive material. In the preferred embodiment, the retainer 40 and washer 44 are constructed of plastic. The retainer 40 and washer 44 electrically isolate the metal rivet 42, the metal pressure/vacuum valve assembly 30, and a metal diaphragm 46 supporting sealing gasket 48 from the metal outer shell 20. As will be explained in more detail, the electrically non-conductive retainer 40 and washer 44 electrically isolate an extension or probe 50 from the radiator 12.

Continuing to refer to FIG. 1, the extension or probe 50 is connected to the rivet 37 of the vacuum valve member 36 and extends axially inwardly through the radiator filler neck 12 into the radiator to a point just below the normal level of the coolant 51 in the radiator. An electrial terminal 52 is attached to the isolated rivet 42 and provides an electrical connection to the probe 50 exterior to the radiator cap 10.

As can be seen in the Figures, the extension or probe 50 has a generally cup or bell shape which opens axially inwardly. This shape expands the probe surface contacting the coolant in the radiator. Thus, there is less chance of a false indication of a low coolant level as a result of movement of the coolant during operation of the vehicle. It will, however, be understood that the present invention is not intended to be limited to any particular shape for the extension 50.

Figure 2:
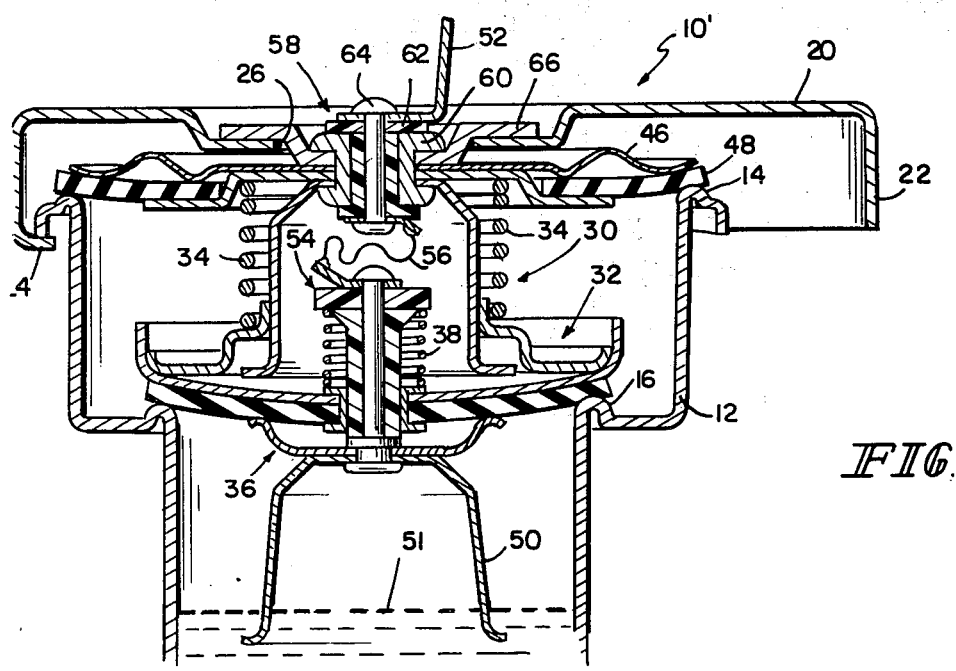
FIG. 2 is another embodiment of a radiator closure cap constructed according to the present invention.

Referring now to FIG. 2, another embodiment of a radiator closure cap 10' includes many of the same features as the cap 10 shown in FIG. 1. These similar features are identified by the same reference numerals in FIG. 2. In cap 10', a rivet 54 for retaining the vacuum valve member 36 is coated with an electrically non-conductive material. Thus, rivet 54 is electrically isolated from the remaining portions of the pressure/vacuum valve assembly 30. While the rivet 54 is metal, it is coated with an electrically non-conductive material such as plastic or a polyvinyl chloride. A lead wire 56 is electrically connected to the metal portion of rivet 54.

A rivet 58 for attaching the outer shell 20 to the pressure/vacuum valve assembly 30 includes a radially outer metallic portion 60, an electrically non-conductive sleeve 62 extending axially therethrough, and a metallic post 64 received in the sleeve 62. The lead wire 56 is electrically coupled to the metallic post 64. Electrical terminal 52 is also connected to post 64 to provide an electrical connection exterior to the shell 20. In cap 10', post 64 is electrially isolated from the outer shell 20 by the electrically non-conductive sleeve 62. Thus, a metal retainer 66 can be used in the connection between the outer shell 20 and the valve assembly 30. Further, it will be appreciated that since the rivet 54 is electrically isolated from valve assembly 30, the electrially non-conductive washer 44 is not needed.

The cap 10' could be modified by eliminating sleeve 62 and constructing the outer portion 60 of an electrically non-conductive material. Thus, post 64 could be inserted axially through the radially outer portion 60 and be isolated from the metal retainer 66.

Figure 3:
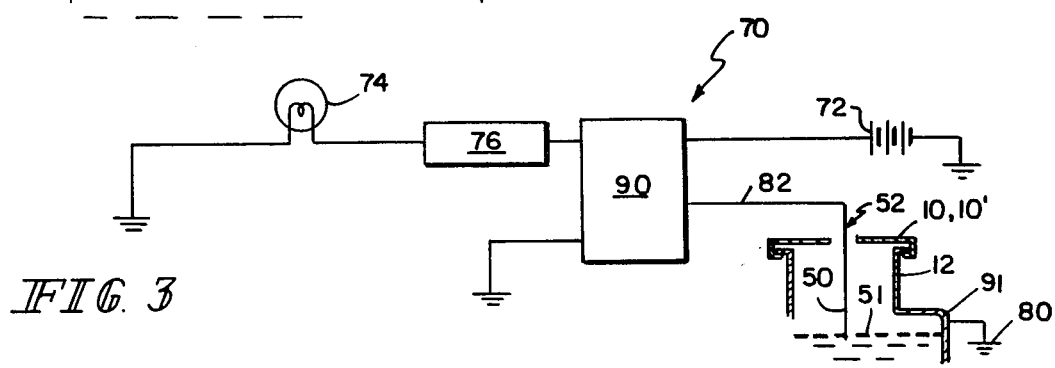
FIG. 3 is a schematic diagram of an electrical system including a radiator closure cap embodying the present invention.

Referring now to FIG. 3, a system 70 for sensing and indicating the coolant level within a vehicle radiator includes a cap 10 or 10' embodying the present invention having an extension or probe 50 projecting therefrom into the radiator interior. The extension or probe 50 is electrically isolated from the radiator 12. In cap 10 embodying the present invention, this isolation is provided by retainer 40 and washer 44. In cap 10' embodying the present invention, electrical isolation is provided by coated rivet 54 and rivet 58.

The electrical circuit for detecting and indicating the coolant level includes a power source 72, an indicator 74, and a time-delay means 76. Power source 72 may be the vehicle power source. Indicator 74 preferably is mounted in the passenger compartment of the vehicle to provide an indication to the operator of the vehicle of the level of the coolant. Although a visual indicator is shown in FIG. 3, an audible indicator could be used without departing from the scope of the invention. Time-delay means 76 can be any conventional circuit or other device for providing a delay before changing the state of indicator 74. This delay reduces the possibility of a false indication due to temporary changes in the coolant level such as might occur during operation of the vehicle. While the time delay is a desirable feature, it is not essential to the present invention.

Typically, the radiator 12 is connected to ground 80. An electrical connection 82 connects the circuit to terminal 52 on the outer shell 20.

In operation, when the coolant level 51 in the radiator is sufficient to contact the extension or probe 50, the circuit is completed through the coolant 51 and the radiator 12 so that the indicator is in a first state. When the coolant level in the radiator is not sufficient to contact the extension or probe 50, the circuit is incomplete and the indicator is in a second state. It will be appreciated that if it is desirable for the indicator 74 to be off when the coolant level contacts the extension 50 and on when the coolant level does not contact the extension 50, then the circuit will require a controller circuit for the electrical signal.

An electrical circuit 90 compares the resistance from probe 50 to vehicle ground 80. An increase in resistance above a preset trigger level indicates absence of coolant and allows current to pass through the time delay 76 to the indicator 74.

Circuits for performing the above function are well known and are not a feature of this invention.

The use of an electrically isolated filler neck 12, i.e., a plastic filler neck on a metal radiator assembly 91, may render isolation of the probe 50 from the outer shell 20 unnecessary. However, the concept of using a probe as part of the cap assembly for water level detection remains the same.

What is claimed is:

1. A cap for a radiator having an interior for containing a fluid, comprising an outer shell, an electrically conductive valve assembly, mechanical connecting means for connecting the valve assembly to the outer shell, an electrically conductive probe projecting into the radiator interior for sensing a fluid level in the radiator interior, electrically conductive coupling means for coupling the probe to the valve assembly, means for electrically isolating the valve assembly and the probe from the outer shell, electrical connecting means providing an electrical connection to the valve assembly and through the valve assembly to the probe, an indicator electrically connected to the connection means for indicating the fluid level in the radiator interior sensed by the probe, and means for providing a time delay between the sensing of the fluid level by the probe and the indicating of the fluid level by the indicator.

2. The cap of claim 1 wherein the mechanical connecting means is electrically conductive and is electrically isolated from the shell to isolate the valve assembly and probe therefrom and the electrical connecting means is an electrically conductive terminal on the mechanical connecting means.

3. A cap for a filler neck of a radiator having an interior, the cap comprising an outer shell, an electrically conductive valve assembly, electrically conductive connecting means for mechanically connecting the valve assembly to the outer shell, means for electrically isolating the connecting means from the radiator, an electrically conductive probe extending into the interior of the radiator, means for electrically coupling the probe to the connecting means, and terminal means providing an electrical connection to the connecting means.

4. A cap for a filler neck having a seat, for a radiator having an interior for containing a fluid, the cap comprising an outer shell having a central opening and a means for engaging the filler neck, a closure means including a pressure valve assembly means having a biasing means for urging the pressure valve assembly means toward the seat, an electrical connection means extending through the central opening, an electrically non-conductive retainer means disposed in the central opening between the electrical connection means and the outer shell for electrically isolating the electrical connection means form the outer shell, an electrically conductive probe means connected to the closure means and extending into the radiator interior, the electrical connection means, closure means, and probe means being in electrically conductive contact to provide an electrically conductive path between the electrical connection means and probe means.

* * * * *